Feb. 14, 1950 R. B. MALLEY 2,497,617
FOLLOW-UP MECHANISM
Filed March 18, 1946
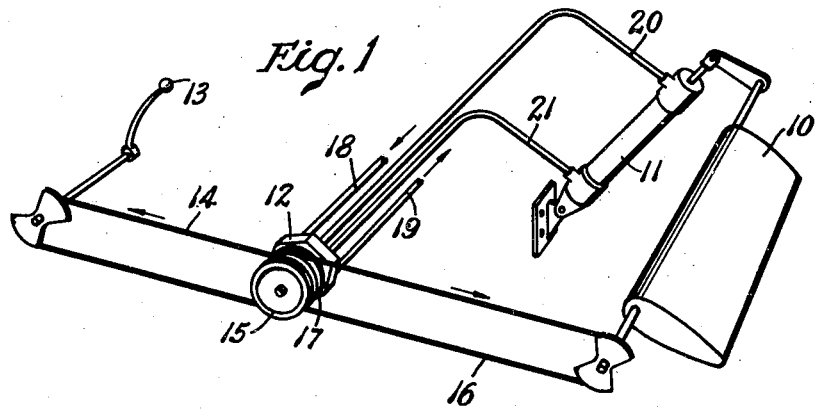
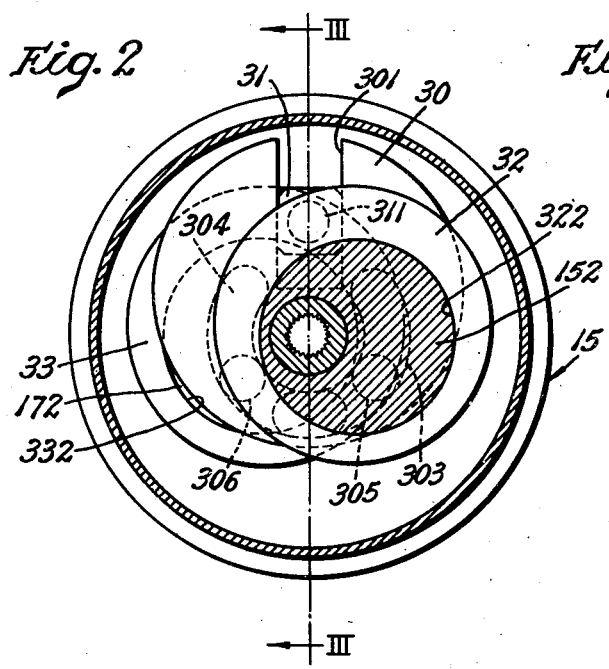 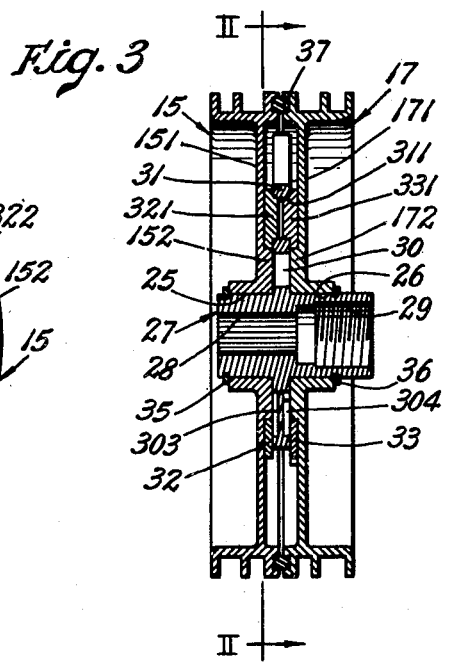
INVENTOR.
RAYMOND B. MALLEY
BY *E. Woodbury*
ATTORNEY Patented Feb. 14, 1950

2,497,617

UNITED STATES PATENT OFFICE 2,497,617

FOLLOW-UP MECHANISM

Raymond B. Malley, Studio City, Calif., assignor to Bendix Aviation Corporation, South Bend, Ind., a corporation of Delaware Application March 18, 1946, Serial No. 655,303

5 Claims. (Cl. 74—479)

This invention relates to mechanical movements of the type in which movement of either of two driving members moves a driven member. Such mechanisms are useful for many purposes, including the actuation of a control in one direction a predetermined distance to produce a predetermined movement of a controlled member, and the subsequent actuation of the control the same distance in the opposite direction in response to completion of the predetermined movement of the controlled member.

An object of the invention is to provide a mechanical movement of the type referred to which is simple and inexpensive to build, has relatively little lost motion, and can be made in compact form while at the same time being capable of transmitting substantial torque.

Conventional mechanisms of the general type referred to employ gear trains of the planetary or differential type, which are relatively expensive if made to close tolerances, and have excessive lost motion if not made to close tolerances.

The present invention eliminates gears and their defects by employing a peculiar arrangement of eccentrics coupled to a cross-head, the particular construction and advantages of which will appear from the following detailed description with reference to the drawing, in which:

Fig. 1 is a schematic perspective view showing a mechanism in accordance with the invention employed for controlling a valve in a hydraulic system for actuating a flap on an airplane;

Fig. 2 is a cross section through the mechanism constituting the invention, the section being taken in the plane II—II of Fig. 3; and Fig. 3 is a longitudinal section taken in the plane III—III of Fig. 2.

Referring to Fig. 1, there is shown schematically a flap 10 actuated by a hydraulic jack 11 which is controlled by a valve 12. The valve 12 is jointly controlled by a control handle 13 and by the flap 10. Thus the handle 13 is linked by a belt 14 to a pulley 15 on the valve 12, and the flap 10 is linked by a belt 16 to a pulley 17 on the valve 12. Valve 12 may be of the four-way type supplied with pressure fluid through a line 18 and having a return line 19 through which fluid may be exhausted. The valve is also connected by lines 20 and 21 respectively, to opposite ends of the hydraulic jack 11. It may be assumed that the valve 12 is of a well known type which: in a neutral position closes the lines 20 and 21; when moved in one direction from neutral position connects the pressure line 18 to the line 20 and the return line 19 to the line 21; and when moved in the other direction from the neutral position connects the pressure line 18 to the line 21 and connects the jack line 20 to the return line 19.

The present invention comprises a mechanism which couples the two pulleys 15 and 17 to the control shaft of the valve 12 in such a way that movement of either of the pulleys 15 or 17 in either direction moves the shaft of the valve 12 in the same direction. If it be assumed that the handle 13 is moved forward (to the left), the belt 14 is shifted in the direction indicated by the arrow, which rotates the pulley 15 counter-clockwise. Through the mechanism of the present invention, the pulley 15 in turn rotates the shaft of the control valve 12 counter-clockwise. Let it further be assumed that this admits pressure fluid from the pressure line 18 to the jack line 21 and connects the jack line 20 to the return line 19. This moves the piston of the jack in such direction as to rock the flap 10 clockwise, and the movement of the flap is transmitted through the belt 16 to the pulley 17, causing it to rock clockwise. The movement of the pulley 17 in clockwise direction moves the shaft of the valve 12 in the same direction, or back toward neutral position, and when the flap 10 has moved into a predetermined position corresponding to the distance through which the control handle 13 was moved, the movement of the pulley 17 in clockwise direction will have fully compensated for the previous movement in clockwise direction of the pulley 15, thereby restoring the valve 12 back to neutral position, to hold the flap 10 in the position into which it has been actuated. Whenever the handle 13 is moved, the valve 12 is opened to apply pressure fluid to one end or the other of the jack 11 to move the flap 10 in the desired direction, and when the flap has moved into the corresponding position, the movement of the pulley 17 will have restored the valve 12 neutral position.

Referring now to Fig. 3, it will be observed that the pulleys 15 and 17 both have central journals 25 and 26 rotatably fitted on a hub 27, which hub is provided with a splined opening 28 for fixation to the shaft of the valve or other device to be actuated thereby. The splined shaft 28 may be counter-bored at one end and threaded as indicated at 29, but the particular manner of connection of the hub 27 to the shaft to be controlled thereby does not constitute a part of the present invention.

Formed integrally with the hub 27 is a thin flange 30 which, as shown to best advantage in Fig. 2, is provided with a radial slot 301, which contains a cross-head member 31 dimensioned to slidably fit in the slot 301. This cross-head member 31 has a central circular aperture 311 which is engaged by bosses 321 and 331 in a pair of link members 32 and 33 respectively, which are identical in shape but reversed in position. Thus the link member 32 has a circular opening 322 therein which is rotatably fitted on a large crank pin 152 which projects inwardly from the flange 151 of the pulley 15. It will be observed that the boss 321 on the link member 32 projects away from the flange 151 of pulley 15 and approximately half way into the opening 311 in the cross-head member 31. The other link member 33 likewise has a circular opening 332 which is fitted on a large crank pin 172 projecting inwardly from the flange 171 of the pulley 17, and the boss 331 on this link member 33 projects away from the flange 171 of pulley 17 and approximately half way through the cross-head member 31.

The pulleys 15 and 17 may be retained on the hub 27 by snap rings 35 and 36. The annular crack between the pulleys 15 and 17 may be closed by a felt ring 37 to exclude dust from the mechanism.

The mechanism disclosed in Figs. 2 and 3 operates as follows: Let it be assumed that as shown in Figs. 2 and 3 the pulleys 15 and 17 are in a neutral position. It will be observed that the crank pins 152 and 172, in the position shown in Fig. 2, are displaced substantially 180° apart. Furthermore, a line extending through the centers of the crank pins 152 and 172 is perpendicular to the slot 301 in the flange 30. Now assume that the pulley 15 is rotated counter-clockwise. This carries the link member 32 in the same direction, tending to carry the cross-head member 31 with it. However, the cross-head member is limited in its motion by the fact that it is also pivotally connected to the link member 33, which, so long as the pulley 17 is stationary, can only rotate on its crank pin 172. Accordingly, the cross-head member 31 is moved in a circular path about the center of the crank pin 172. This carries the flange member 30 counter-clockwise and at the same time moves the cross-head member 31 outwardly in the slot 301.

Now assume that the pulley 15 is stopped and that the pulley 17 is rotated in the opposite direction (clockwise with reference to Fig. 2). This carries the crank pin 172 in a clockwise path, which carries the link 33 with it. At this time, however, the cross-head member 31 is constrained by the link member 32 to move only in a circular path about the center of the crank pin 152. Hence the flange 30 is carried clockwise, and the cross-head member 31 is moved outwardly in the slot 301.

If the pulley 15 is rotated clockwise, the cross-head member 31 is moved inwardly in the slot 301, and the flange 30 is moved clockwise. It follows also that if the pulley 17 is rotated counter-clockwise, the cross-head member 31 is moved inwardly in the slot 301, but the flange 30 is rocked counter-clockwise.

It will be observed that the pulleys 15 and 17 constitute a pair of primary driving means movable in rotational paths, and that the link members 32 and 33 respectively constitute link means coupling the primary driving means to the cross-head member 31, which constitutes a secondary driving member for driving the flange 30, which constitutes a driven member. It will also be observed that since the distances from the centers of the crank pins 152 and 172 to the center of the cross-head member 31 are equal, the angle of intersection between the link means at the cross-head (the angle between two lines drawn from the centers of the crank pins 152 and 172, respectively, to the center of the cross-head 31) is always bi-sected by the path of movement of the cross-head 31 in the slot 30 which guides it.

Obviously the pulleys are capable of only limited movement in either direction, and the extent to which movement of either pulley in one direction can be compensated for by movement of the other pulley in the opposite direction is also limited. However, these limited movements of the parts are of no importance in the operation of many devices such as valves, in which the maximum angular movement to be applied may be only a small fraction of a revolution.

It is desirable to definitely limit the extent of movement of each of the pulleys 15 and 17 relative to the hub 27 and this can be readily accomplished by providing arcuate slots in the flange 30 which are engaged by bosses on the pulleys. These arcuate slots in the flange are shown at 303 and 304 in Figs. 2 and 3, and the location of the bosses on the end faces of the crank pins 152 and 172 which project into these slots are indicated by the dotted circles 305 and 306 in Fig. 2.

It will be readily apparent from the drawing and the foregoing description that the invention constitutes a very simple and compact mechanism for achieving the desired purpose, and it will be observed that because of the small number of parts and the simple nature of the bearing surfaces therebetween, they can be readily fitted with sufficient accuracy to keep the lost motion within any desired limits.

Various departures from the exact description shown can be made while still utilizing the advantages of the invention, which is to be limited only to the extent set forth in the appended claims.

I claim:

1. A mechanism of the type described comprising: a driven member adapted to be restricted to movement in a first path; secondary driving means coupled to said driven member for movement with respect thereto only in a second path extending at an angle to said first path; a pair of independently movable primary driving members movable in third and fourth paths respectively; and link means independently linking each of said primary driving members to said secondary driving member, in which said second path bisects the angle of intersection of said link means at said secondary driving means.

2. A mechanism of the type described comprising: a rotatable driven member adapted to be supported for rotation; a secondary driving member and means connecting it to said driven member for radial movement with respect thereto; a pair of independently rotatable primary driving members and means supporting them for rotation coaxial with said driven member; and link means independently linking each primary driving member to said secondary driving means.

3. A mechanism of the type described comprising: a hub member; a pair of co-axial primary driving members rotatably mounted on said hub member; cross-head means and cross-head guide means coupling said cross-head means to said hub for radial movement with respect thereto, and rotary movement therewith; crank pin means on each of said driving members and separate link means linking each of said crank pin means to said cross-head means.

4. A mechanism as described in claim 3 in which said cross-head means is disposed intermediate said rotary driving members and said crank pin and link means are positioned on opposite sides of said cross-head means.

5. A mechanism as described in claim 3 in which each of said crank pin means comprises an eccentric including said hub within its periphery, and each of said link means comprises an eccentric collar fitted on its associated eccentric.

RAYMOND B. MALLEY.

REFERENCES CITED

The following references are of record in the file of this patent:

UNITED STATES PATENTS

| Number | Name | Date |
|---|---|---|
| 952,398 | Winton et al. | Mar. 15, 1910 |
| 1,541,052 | Hunt | June 9, 1925 |
| 1,620,744 | Tibbetts | Mar. 15, 1927 |
| 1,625,563 | Payne | Apr. 19, 1927 |
| 2,077,150 | McWhirter et al. | Apr. 13, 1937 |
| 2,205,651 | Hoffman et al. | June 25, 1940 |